United States Patent [19]

McCloud

[11] Patent Number: 5,203,704
[45] Date of Patent: Apr. 20, 1993

[54] METHOD OF COMMUNICATION USING POINTING VECTOR GESTURES AND MNEMONIC DEVICES TO ASSIST IN LEARNING POINT VECTOR GESTURES

[76] Inventor: Seth R. McCloud, 16201 Jordan Rd., Arlington, Wash. 98223

[21] Appl. No.: 632,325

[22] Filed: Dec. 21, 1990

[51] Int. Cl.⁵ .............................................. G09B 19/00
[52] U.S. Cl. ................................... 434/156; 434/222; 434/223; 434/112
[58] Field of Search ............... 434/185, 156, 222, 223, 434/160, 159, 112; 283/46

[56] References Cited

U.S. PATENT DOCUMENTS

| | | | |
|---|---|---|---|
| 1,392,014 | 9/1921 | Jones | 283/46 |
| 3,407,515 | 10/1968 | Pitman | 434/185 |
| 3,858,333 | 1/1975 | Kopp | 434/156 X |
| 4,074,444 | 2/1978 | Laenger, Sr. et al. | 434/112 |
| 4,713,008 | 12/1987 | Shocker et al. | 434/156 X |
| 4,838,792 | 6/1989 | Hoyeck | 434/164 X |

FOREIGN PATENT DOCUMENTS 1129640 8/1982 Canada ............................. 434/185

OTHER PUBLICATIONS

Hilda B. Fisher, "Improving Voice and Articulation", 1966, Chapter 5, pp. 203-215.

*Primary Examiner*—John J. Wilson
*Assistant Examiner*—Jeffrey A. Smith
*Attorney, Agent, or Firm*—Dean A. Craine

[57] ABSTRACT

A pointing gesture, a method of communication using a set of pointing gestures, and mnemonic devices are described used between a sender and a receiver. The pointing gestures are performed by the sender using a gesturing device which comprises a primary indicator and a plurality of ancillary indicators. The pointing gestures are performed by the sender in a field located between the sender and the receiver. The field has a plurality of possible vector patterns created therein. Each vector pattern has a plurality of relocating line and point vectors. In the preferred embodiment, the gesturing device comprises the sender's hand with the index finger serving as the primary indicator and the thumb and middle finger serving as ancillary indicators. Also disclosed herein is a method of communication using a set of thirty-six pointing gestures with each pointing gesture programmed or associated with one communication code. In the preferred embodiment, each code represents one of thirty-six phonemes in a modified set of IPA phonemes. Mnemonic devices are also disclosed herein to help the sender and receiver remember and perform the positions of the pointing gestures and their respective code associations.

17 Claims, 12 Drawing Sheets

METHOD OF COMMUNICATION USING POINTING VECTOR GESTURES AND MNEMONIC DEVICES TO ASSIST IN LEARNING POINT VECTOR GESTURES

TECHNICAL FIELD

This invention relates generally to the field of communication and, more particularly, to the field of dactylology, the field of communication which uses signs or gestures made with the fingers and hands.

BACKGROUND ART

From sign language to body language, individuals use a myriad of non-vocal methods to communicate with other individuals and with various electrical devices. It is believed by many anthropologists, that long before voice communication was developed, gestural communication, that is, communication using gestures made with the fingers and hands, was widely used between individuals.

Today, there are several known methods of gestural communication. One of the most common methods uses universally adapted gestures or hand signals to convey familiar expressions or ideas. Some well known examples include the clenched fist of anger, the "V" sign for victory or peace, and the "thumbs down" signed for disapproval, to name a few.

Other types of communication methods that use gestures include sign language and finger spelling. With sign language, an eloquent and living language developed by North American Indians, gestures are made with the hand and fingers to represent letters, sounds, words, or phrases. In finger spelling, each letter of the alphabet is represented by a specific position of the finger on one hand. Today, both sign language and finger spelling are used primarily by deaf people.

Some of the major drawbacks with the currently known methods of communication using gestures include the following: (1) many gestures are difficult to perform and require the sender to have great finger or hand dexterity; (2) many gestures are difficult to remember and to use at voice conversational speeds; (3) no currently known method of communication that uses gestures are adaptable for use in different languages, and; (4) no currently known method of communication that uses gestures is adaptable for both use between humans and, between human and electrical devices, such as computers.

A gesture and a method of communication using gestures which do not have the above mentioned drawbacks would be highly desirable.

DISCLOSURE OF INVENTION

It is a general object of the present invention to provide a method of communication using gestures.

It is an object of the present invention to provide a gesture that is easy to learn, perform and to use.

It is another object of the present invention to provide a method of communication using the above gesture that can be used at or that exceeds conversational speeds.

It is a further object of the present invention to provide such a method of communication that is adaptable for communicating in different languages.

It is another object of the present invention to provide various mnemonic devices which will aid a sender and a receiver when communicating with the pointing gestures.

It is a still further object of the present invention to provide such a method of communication that is adaptable for use between individuals, and between an individual and a mechanical or electrical device, such as a computer.

The present invention teaches a method of communicating using an adaptable set of programmable pointing gestures made by a sender to a receiver. The pointing gestures are adaptable in that they may be used to communicate between two individuals, between an individual and a mechanical or electrical device, or between two mechanical or electrical devices. The pointing gestures are programmable and thereby universal, in that they enable one to assign any recognizable communication code to each pointing gesture.

The method of communication disclosed herein uses a gesturing device to perform a plurality of pointing gestures made in or on a two or three dimensional field established between the sender and a receiver. In the preferred embodiment, the field is a two dimensional planer surface containing a plurality of vector patterns. Each vector pattern comprises a plurality of vectors which radiate from a point of origin in the field. In the preferred embodiment, the field has nine possible vector patterns with each vector pattern having nine vectors.

The gesturing device comprises at least one primary indicator and a plurality of ancillary indicators. The primary indicator is used to select a point of origin. As mentioned above, each point of origin in the field is associated with one vector pattern. When a point of origin is established in the field, a vector pattern radiating from the point of origin is automatically established in the field. The primary indicator is then used to delineate one vector in the vector pattern. After the vector has been delineated by the primary indicator, the ancillary indicators are disposed together with the primary indicator into one of a plurality of configurations. In the preferred embodiment, the gesturing device is the sender's hand using the index finger as the primarily indicator and the middle finger and thumb as the ancillary indicators. Although other fingers may be used to form the pointing gesture, these three fingers are preferred because they are stronger, more flexible, and can be used with greater dexterity and less mental effort. Also, these fingers enable the sender to form pointing gestures that are more natural for most individuals. The pointing gesture is completed when the primary and ancillary indicators pause briefly after delineating a vector and after being disposed in the desired configuration.

When performing a pointing gesture, the sender's hand is first placed in the field. The sender, using his index finger or primary indicator, touches a point in the field to select a vector pattern. The sender then uses his index finger to delineate one vector in the vector pattern. As the vector is delineated, its direction and distance is detected and identified by the receiver. As the index finger reaches the end point of the vector, the ancillary indicators are concurrently moved into one of several positions to form, together with the primary indicator, one of a plurality of configurations. The configuration is then detected and identified by the receiver. In the preferred embodiment, there are four possible configurations. By selecting one of nine possible vectors in the vector pattern and selecting one of four possible configurations, a set of thirty six unique pointing gestures may be performed by the sender.

An important feature of the invention disclosed herein is the vector patterns relocating in the field after each gesture is performed. Each vector is delineated by moving the primary indicator from the vector's point of origin to the vector's end point. After the primary indicator and the ancillary indicators have been disposed into a configuration and paused briefly, the gesture is completed. At that time, a new vector pattern is formed in the field. This is accomplished by designating the end point of the vector delineated by the previous gesture as the new point of origin of the next vector pattern. This feature enables the sender to begin the next pointing gesture at the end point of the previous pointing gesture which reduces the accuracy requirement when performing the pointing gesture, and also reduces the amount of time required to perform a plurality of pointing gestures in succession, as required for most communications.

As with all communications, a specific language must be selected by the communicating parties. With dactylological communications, a set of gestures must be used with each gesture representing some unique symbol or sound in the selected language. As described above, the preferred embodiment contains a set of thirty-six unique pointing gestures. Each pointing gesture in the set is programmed or associated with one unique sound or symbol, hereinafter known as a communication code. In the preferred embodiment, English is the selected language with each pointing gesture being programmed or associated with one phonetic sound used in the English language. Although in the preferred embodiment, only thirty-six unique pointing gestures are used, the number of possible pointing gestures in a particular field is unlimited. This feature makes the invention disclosed herein adaptable for use with any language or codeable means known to the inventor. It should also be apparent with the preferred embodiment, that because each pointing gesture is associated with one phonetic sound, and because each pointing gesture can be performed quickly, the method of communication using the pointing gestures described herein may be used at or near normal conversational speeds.

In the preferred embodiment, the receiver is another individual who can detect and understand the pointing gestures. In most cases, the individual uses a receiving means, such as his or her eyes and brain, to detect and identify the pointing gestures. It should be understood however, that in other embodiments, the receiver may be a mechanical or electrical device, such as a computer, which uses a receiving means, such as a touch pad or image processor, that can detect and identify the various pointing gestures. Since the pointing gestures can be used either between individuals or between an individual and a mechanical or electrical device, and can be programmed or associated with different communication codes, a universal method of communicating is provided.

Also disclosed herein, is a vector pattern mnemonic device designed to help the sender and receiver to use the pointing gestures. Also, phonetic and alpha-numeric code mnemonic devices are disclosed herein which are designed to help learn how different codes are assigned to each pointing gesture.

BEST MODE FOR CARRYING OUT THE INVENTION

Disclosed herein is a pointing gesture used to communicate. Also disclosed herein is a method of communication using a set pointing gestures containing a plurality of unique pointing gestures each associated with one communication code used in a communication language. The set of pointing gestures may be associated with different communication codes which enables the sender and receiver to communicate in different languages.

Figure 1:
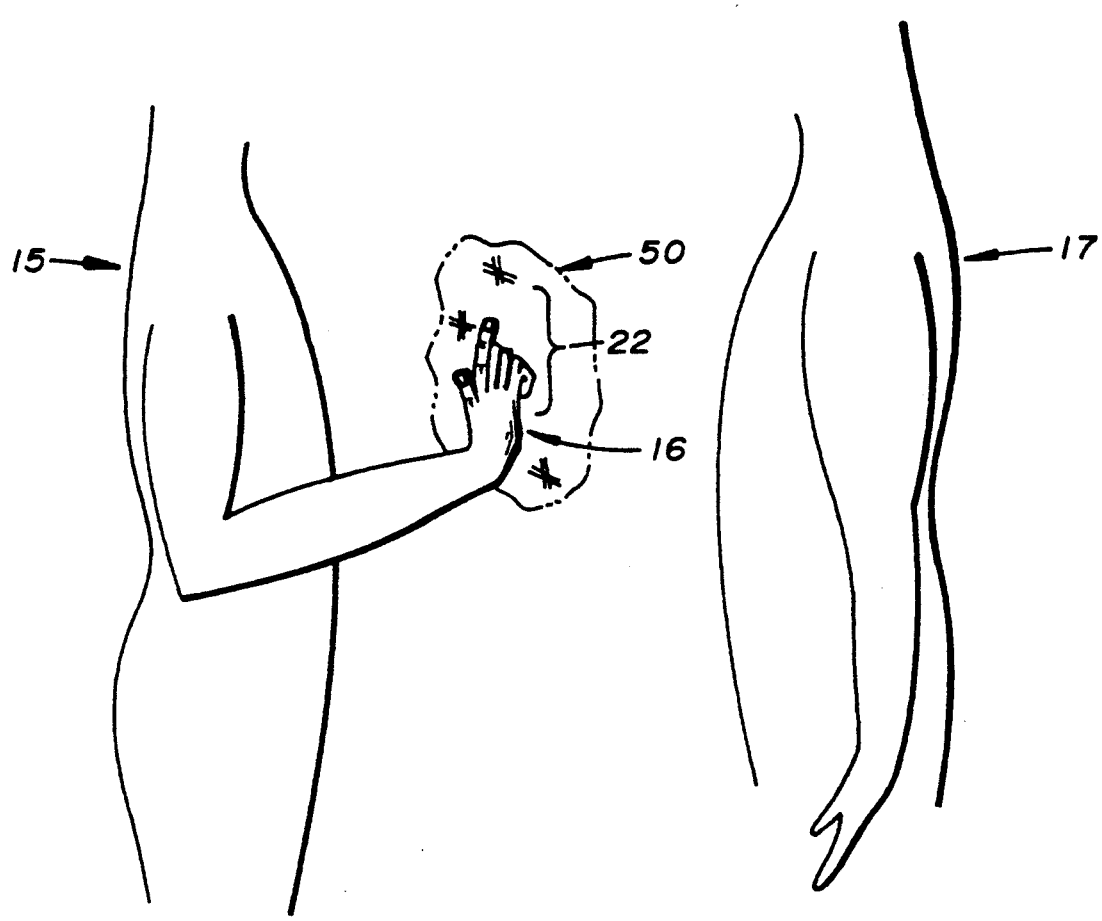
FIG. 1 is an illustration of a sender using a pointing gesture, described herein, to communicate with a receiver.

As shown in FIG. 1, the pointing gesture is performed by a sender 15 to a receiver 17 using a gesturing device, generally referred to by the number 16. The gesturing device 16 performs a plurality of pointing gestures 22 in a unbound field 50 disposed substantially vertically between the sender 15 and the receiver 17. The field 50 is disposed between the sender 15 and the receiver 17 in such a manner so that the pointing gestures 22 may be seen at all times by the receiver 17. As discussed below, each pointing gesture 22 is programmed or associated with at least one communication code which enables the sender 15 to use a plurality of unique pointing gestures to communicate with the receiver 17.

The field 50 itself comprises a substantially flat plane oriented perpendicular to the viewing angle of the receiver 17. The field 50 is activated whenever it is penetrated by the gesturing device's 16 primary indicator, discussed further below. The field 50 remains activated at all times until the communication is terminated by either the sender 15 or the receiver 17.

Figure 2:
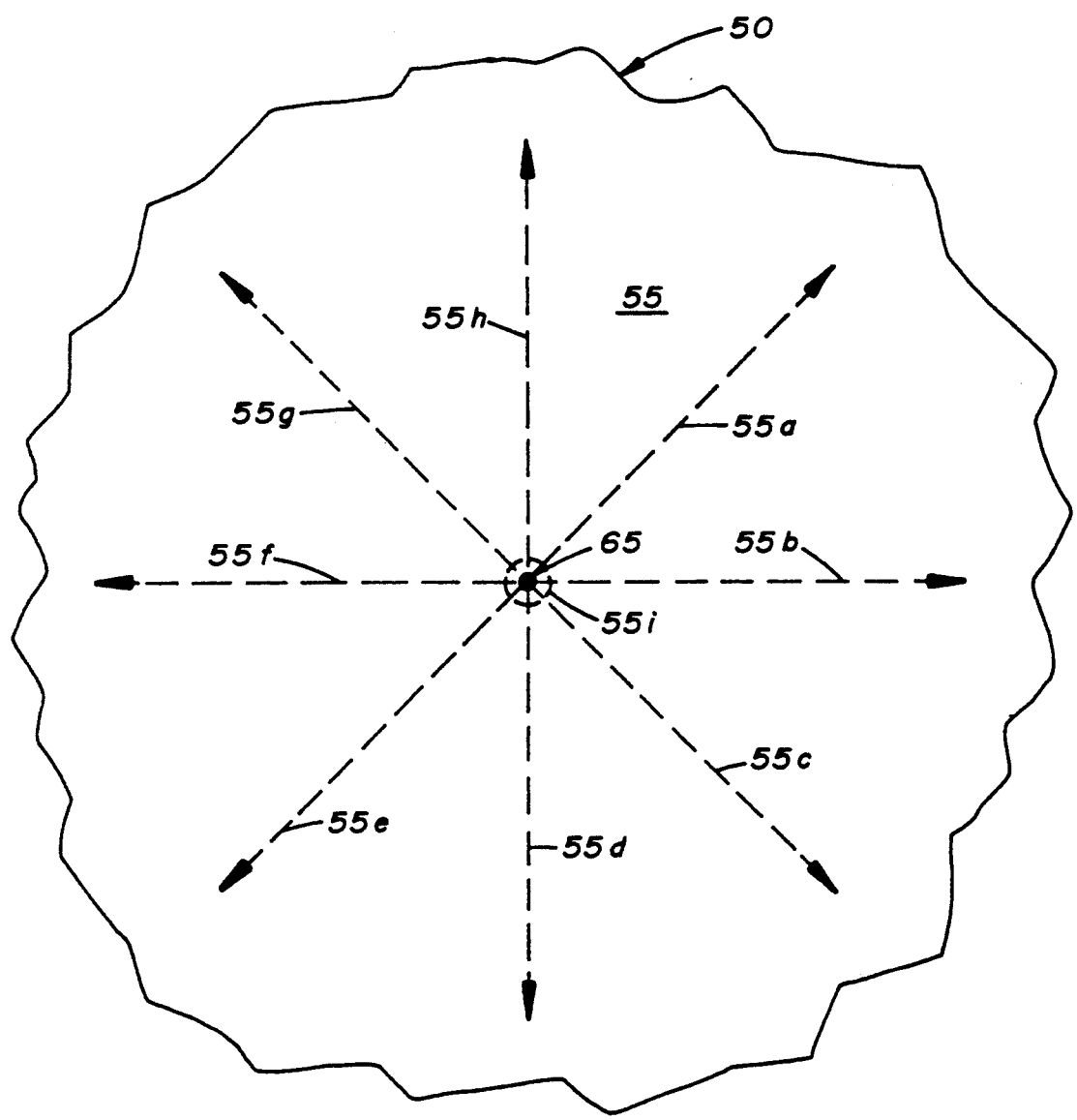
FIG. 2 is a plan view of the field 50 configured in vector pattern 55.

As shown in FIG. 1, in the preferred embodiment, the field 50 is an unbound planar area established between the sender 15 and the receiver 17. When field 50 is activated by penetration of the gesturing device 16, vector pattern 55, shown in FIG. 2, is first established therein. Thereafter, one of a plurality of vector patterns 51-59 shown in FIG. 3, may then be established therein.

Figure 3A:
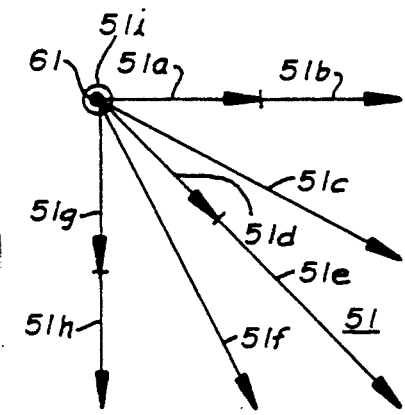
FIGS. 3(a)–(i) are illustrations of nine possible vector patterns that can be created in field 50.
Figure 3B:
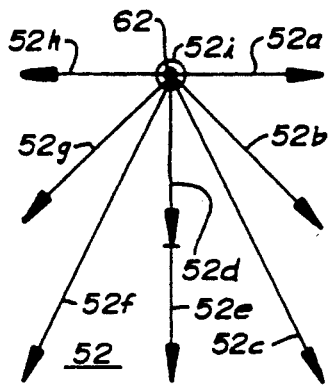
Figure 3C:
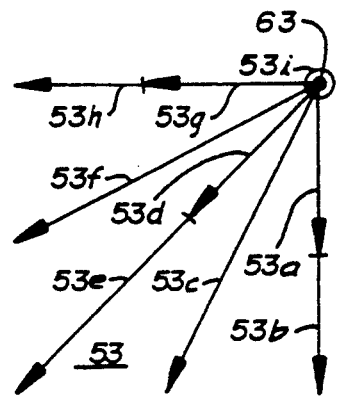
Figure 3D:
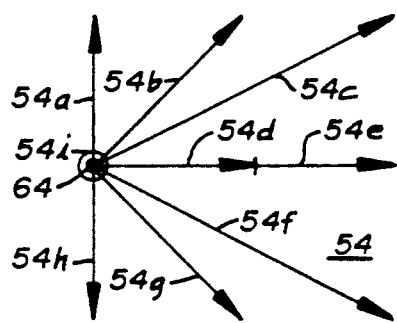
Figure 3E:
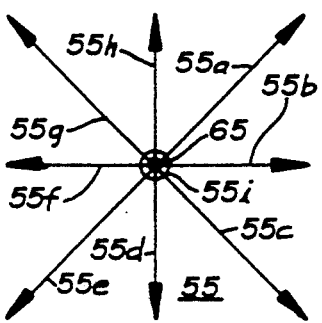
Figure 3F:
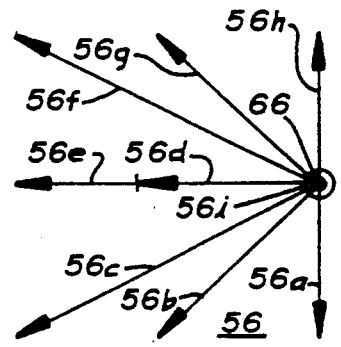
Figure 3G:
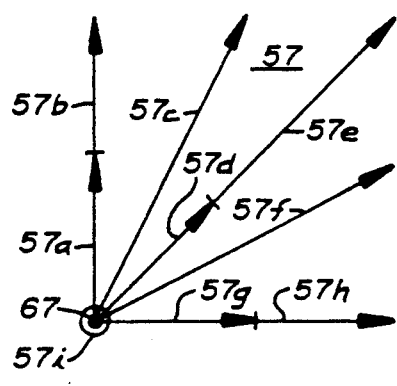
Figure 3H:
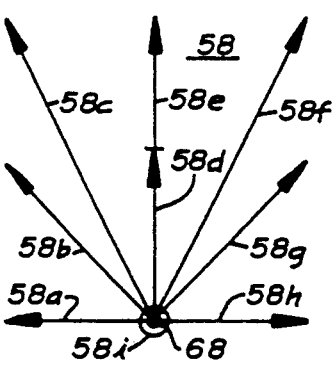
Figure 3I:
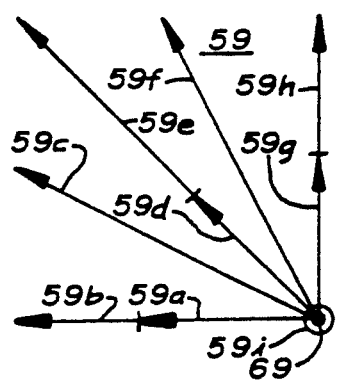

After field 50 is activated, the pointing gesture 22 is then performed therein. After each pointing gesture is performed, the field 50 is automatically configured into one of the nine possible vector patterns 51-59 shown in FIGS. 3(a)-(i). The actual vector pattern created in the field 50 at any moment, depends upon the location of the end point of the vector used in the previous pointing gesture. When, for example, the sender 15 delineates vector 55(b), a new point of origin 66 is established and vector pattern 56, shown in FIG. 3(f), is automatically created. When each pointing gesture is completed, the end point of the vector used in the previous pointing gesture becomes the new point of origin and a new vector pattern is automatically created in the field 50. By establishing new points of origin in the field in this manner, the vectors in the field are said to "relocate" after completing each pointing gesture. The new vector pattern remains established in the field 50 either until the pointing gesture is completed or until the field 50 is inactivated.

FIG. 2 shows vector pattern 55 representing generally all of the possible vector patterns 51-59, containing eight line vectors 55(a)-(h), and one point vector 55(i) which originate from the point of origin 65. The line vectors 55(a)-(h) radiate from the point of origin 65 in equal angles in 360 degrees and point vector 55(i) is located at the same position as the point of origin 65. The line vectors 55(a)-(h) are numbered in each vector pattern 51-59 in a clockwise manner. When two line vectors have the same directional values, the shortest line vector is assigned the first letter. In vector pattern 55, for example, the line vector oriented diagonally upwardly to the right is designated vector 55(a).

Figure 4A:
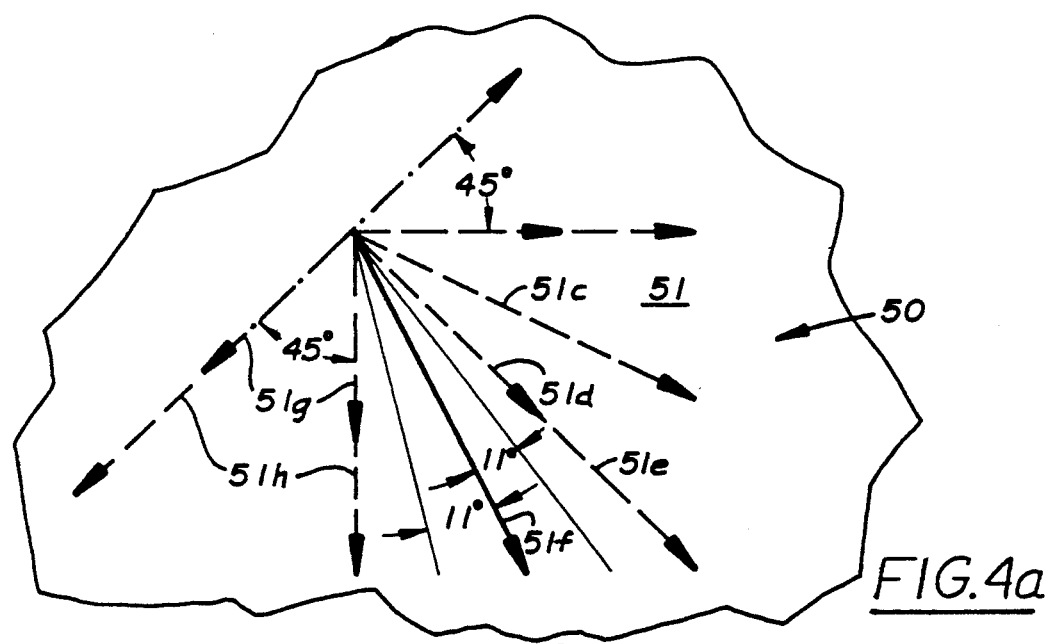
FIGS. 4(a),(b) and (c) are representative illustrations showing the amount of directional variance that the sender can used to delineate a line vector in various vector patterns.
Figure 4B:
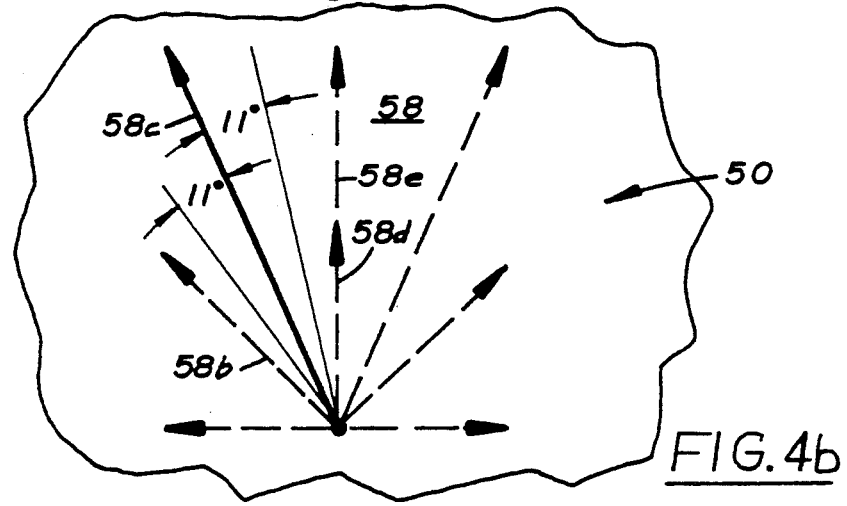

All vector patterns except vector pattern 55 are partially bound. As shown in FIG. 4(a), vector pattern 51, representing also vector patterns 53, 57, and 59, is partially bound along a vertical and a horizontal edge joined together at substantially 90 degrees. FIG. 4(b), shows vector pattern 58, also representing vector patterns 52, 54, and 56, partially bound along one straight edge. It should be understood, that the partially bound vector patterns are "bound" only in a relative sense and that movement of any vector pattern in the field 50 is essentially unrestricted. For example, the sender 15 may find it desirable to enlarge the field 50 at any time during the communication for better viewing or to emphasize an idea conveyed to the receiver. This, could be carried out, for example, by moving the primary indicator in a direction inconsistent with one of the possible vectors in vector pattern. It is understood that the portion of the field outside the vector pattern may be used for other purposes during the communication.

Figure 5:
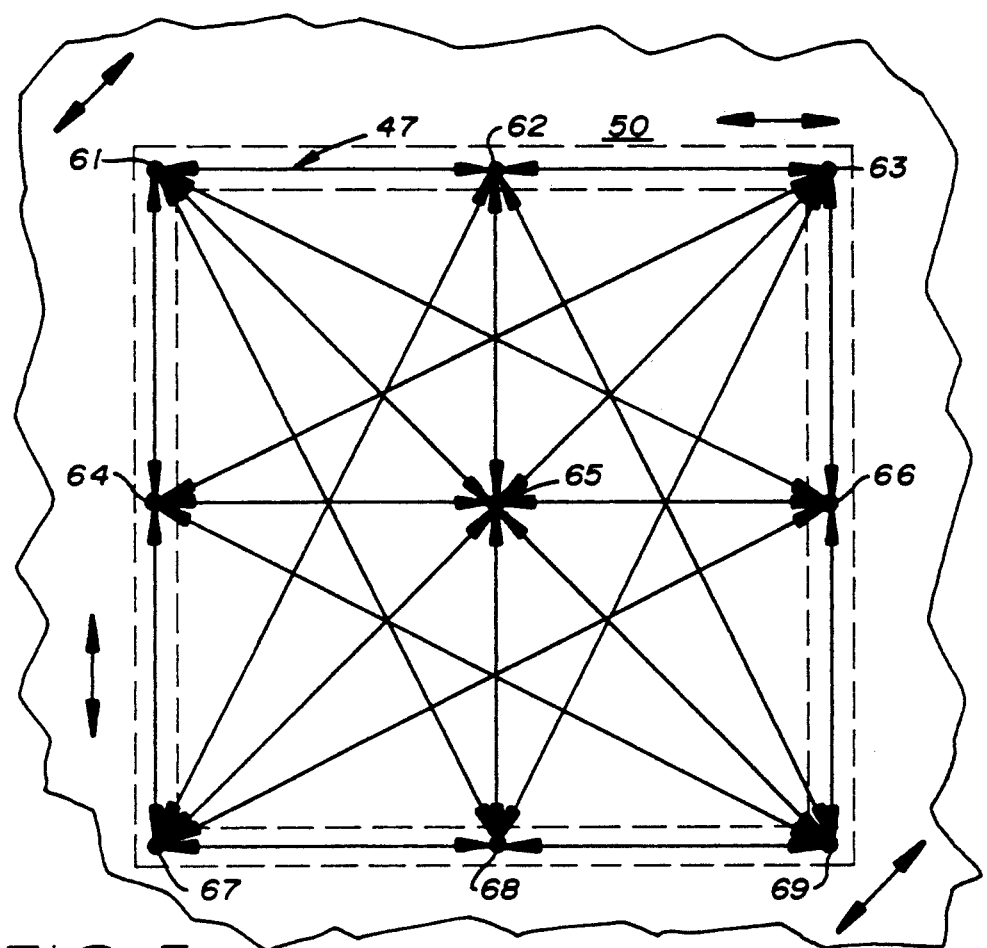
FIG. 5 is an illustration of a shape used as a mnemonic device by the sender and receiver used to remember the relative positions of the vector patterns in the field.

To better understand the relation between the field 50 and the vector patterns 51-59, FIG. 5 shows all of vector patterns 51-59 established simultaneously in the field 50. When shown together in this manner, vector patterns 51-59 form a substantially square vector pattern shape 47. Point of origin 65 is disposed centrally, point of origins 61, 63, 67, 69 are disposed at the corners, and point of origins 62, 64, 66, and 68 are disposed at the mid-points of the vertical and horizontal sides. With the preferred embodiment, described below, shape 47 may be rectangular with a longer horizontal axis than vertical axis since it is generally easier for the sender to move his hand horizontally than it is to move it vertically in field 50.

The feature of "relocating" the vectors in the field 50, enables the sender 15 to immediately begin the next pointing gesture at the end point of the previous pointing gesture without returning to the initial point of origin in the field 50. This, in turn, reduces the accuracy required to form individual the pointing gestures 22 and reduces the amount of time required to perform a plurality of pointing gestures 22 performed in succession, as required for most communications.

In FIGS. 3(a)-(i), the line vectors 55(a)-(h) in vector pattern 55 have initially only directional values and no length or distance values. By moving the primary indicator any desired distance along any line vector 55(a)-(h), a "short" vector length or distance is established. By definition, all the line vectors 55(a)-(h) in vector pattern 55 are "short" vectors. Therefore, whichever line vector is chosen in vector pattern 55 when performing the first initial pointing gesture, the length or distance of the "short" vector is established. In application, the actual length of the "short" vector is dependent upon the gesturing device and the ability of the receiving means used by the receiver 17 to detect and identify the vector selected. In each situation, the length of the vector must be sufficient enough in length to be detected and identified by the receiver 17. In the preferred embodiment, the sender's hand serves as the gesturing device and receiver's eyes act as the receiving means with line vectors 55(a)-(h) typically between 1 to six inches in length. With mechanical or electrical gesturing devices or mechanical or electrical receiving means, the length of line vectors 55(a)-(h) may be substantially more or less.

Figure 6:
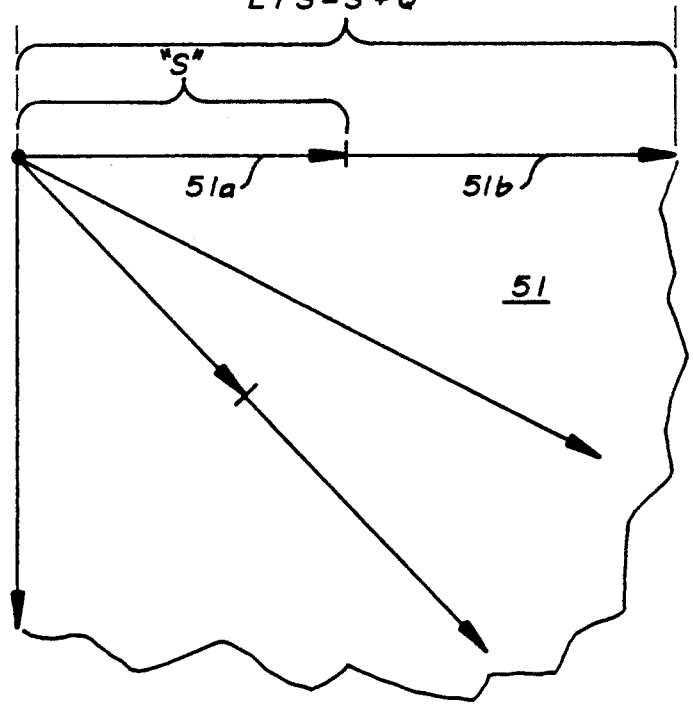
FIG. 6 is a representative illustration of vector pattern 51 showing the line vectors having "short" and "longer-than-short" lengths.

Establishing the length of the "short" vector 55(a)-(h) is important so that the "longer-than-short" vector length may be determined. As shown in FIG. 3, vector patterns 51-54, and vector patterns 56-59 have both "short" and "longer-than-short" vectors. As shown in FIG. 6, vector pattern 51, some line vectors (i.e. 51(a) and 51(b)) have the same directional values but have different length or distance values. Except for the vectors found in vector pattern 55, all the vectors patterns have line vectors which may be one of two possible lengths—"short" or "longer-than-short" (designated by "S" or by "LTS", respectively). As stated above, the length of the "short" vector is established by the sender when delineating the first vector in the first pointing gesture in vector pattern 55. By definition, any line vector longer than the "short" vector is a "longer-than-short" vector. In practice, the difference "Q" between the "short" vector and "longer-than-short" vector must be substantial. As shown in FIGS. 3(a)-(i), each vector pattern 51-59, except vector pattern 55, has three "short" line vectors and five "longer-than-short" line vectors. Since some "short" and "longer-than-short" vectors have the same directional values, it is important that during the performance of the pointing gesture the sender delineate the proper vector length.

When communicating, both the sender 15 and the receiver 17 must know which vector pattern is currently established in the field 50. With each vector pattern, both the sender 15 and the receiver 17 must also know the relative positions of the vectors in each vector pattern shown in FIG. 3. When delineating vectors, the sender 17 must establish an imaginary reference line, such as a receiver's 17 shoulders or the floor or ceiling, which enables the receiver 17 to determine its directional value.

Figure 4C:
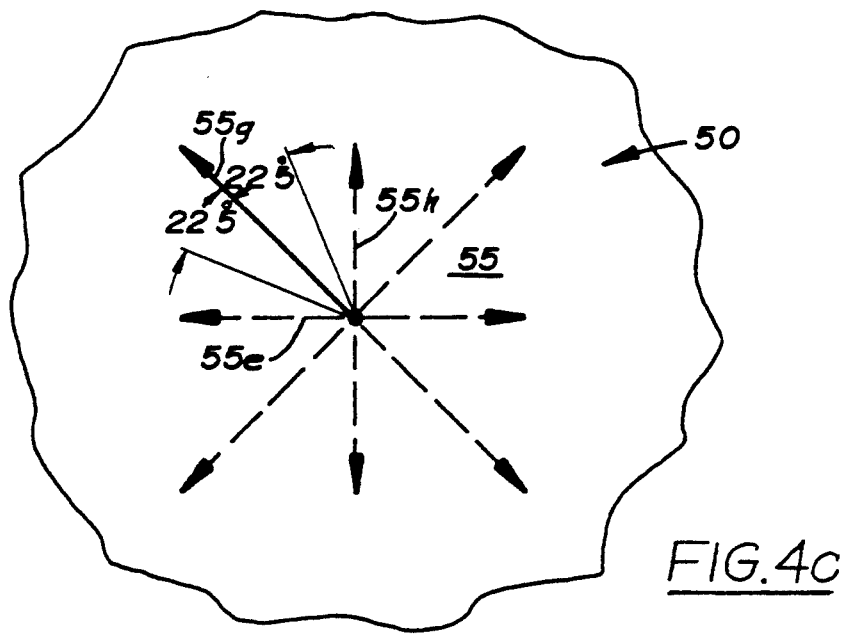

In addition, the sender 15 must also accurately delineate one of the possible vectors in the vector pattern. As shown in FIG. 3, each field has eight line vectors and one point vector. It has been found that most senders 15 can move the primary indicator optimally when the total number of line vectors in each vector pattern is limited to eight. In the preferred embodiment, with the sender's index finger as the primary indicator as discussed below, the maximum amount of directional variation allowed to one side of the line vector when moving the primary indicator is approximately 11 degrees. For example, as shown in FIGS. 4(a) and (b), line vectors 51(f) and 58(c), respectively, are delineated in vector patterns 51 and 58, respectively. When delineating line vectors 51(f) or 58(c), the sender should not vary the direction of the primary indicator more than approximately 11 degrees to each side of line vectors 51(f) or 58(c) respectively. If the direction of the delineated line vector varies more than approximately 11 degrees, the adjacent line vectors 51(d), 51(e) or 51(g) and 58(b), 58(d), and 58(e), respectively, will be delineated instead, which may cause mis-communication. In other vector patterns, a greater directional variance is permitted. For example in vector pattern 55, shown in FIG. 4(c), the direction of the primary indicator can vary up to 22.5 degrees to each side of the line vector 55(g) before adjacent line vectors are delineated. Also, greater directional variance may be permitted for the line vectors located on the edges of the vector patterns which are partially bound, (i.e. vector patterns 51-54 and vector patterns 56-59).

Figure 7:
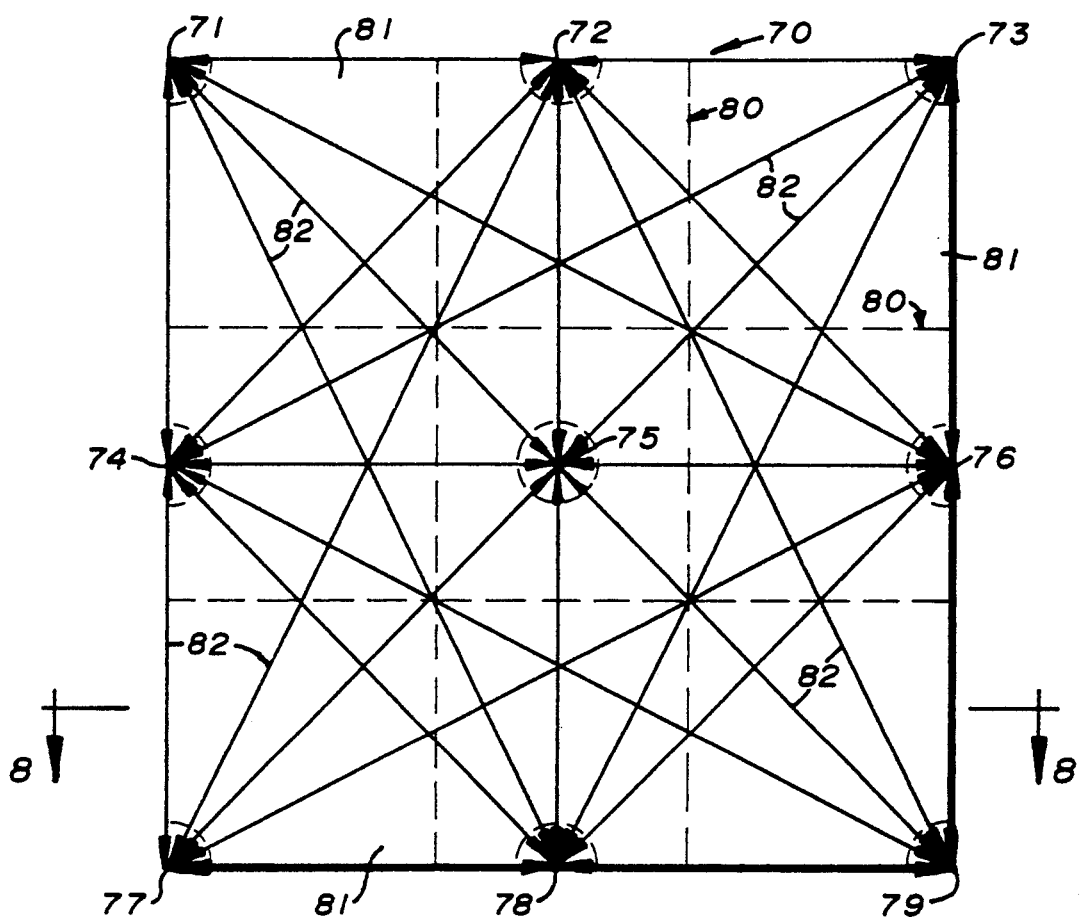
FIG. 7 is a plan view of a vector pattern mnemonic device.
Figure 8:
FIG. 8 is a sectional elevation view of the vector pattern mnemonic device taken along line 8—8 taken in FIG. 7.

It has been discovered that the vectors in the vector patterns 51-59 are easier to learn if a vector pattern mnemonic device 70 is used by the sender and receiver. As shown in FIGS. 7 and 8, a vector pattern mnemonic device 70 is designed to help the sender 15 and receiver 17 learn the nine different vector patterns that can be created in the field 50. The vector pattern mnemonic device 70 comprises a substantially flat sheet of material having the same vertical and horizontal dimensions as the overlapping vector pattern shape 47, shown in FIG. 5. In the preferred embodiment, vector pattern mnemonic device 70 is made of thin lightweight, transparent material, such as polyvinyl acetate film or some other suitable material. Printed on one surface of the mnemonic device 70 are two vertical and two horizontal lines 80 which cross to form nine cells 81 arranged in a tic-tac-toe manner. Graphic lines 80 are printing on one viewable surface of the vector pattern device 70 which outline the tic-tac-toe arrangement of the cells 81. At each corner, at each mid-point of the two vertical and two horizontal edges, and at the central point, are points of origin 71-79 which are used to represent points of origin 61-69 in vector patterns 51-59, respectively. Each point of origin 71-79 is interconnected to the other eight points of origin in the device 70 by a straight line 82, which represent the various line vectors in the vector patterns 51-59. When learning the pointing gestures described herein, the sender and receiver memorize the tic-tac-toe arrangement of cells 81 and the vector representing lines 82 printed on the vector pattern mnemonic device 70.

As mentioned above, a gesturing device 16 is used to perform the pointing gestures in the field 50. The gesturing device 16 itself, comprises at least one primary indicator and a plurality of ancillary indicators. The primary indicator, located on the gesturing device 16, is used to initially activate the field and to establish the initial vector pattern 55 therein. Withdrawing the primary indicator from the field 50 may in some situations, discussed further below, signify the end of the pointing gesture 22. When the field 50 is oriented between the sender 15 and receiver 17 as shown in FIG. 1, the receiver will view the pointing gesture 22 as the mirror image of the pointing gesture 22 as performed by the sender 15, (i.e. left to right to the sender 15, will appear right to left to the receiver 17).

As shown in FIG. 1, in the preferred embodiment, the sender 15 uses his hand as the gesturing device 16. By using the hand, an individual is able to communicate using pointing gestures with other individuals or with mechanical or electrical devices equipped with a receiving means, such as a touch pad or image processor, capable of detecting and identifying each pointing gesture. It should be understood, however, that although the sender's hand is used in the preferred embodiment, other types of gesturing devices, such as mechanical or electrical apparatus having features or elements which can act as primary and ancillary indicators, may be used in place thereof.

Figure 9:
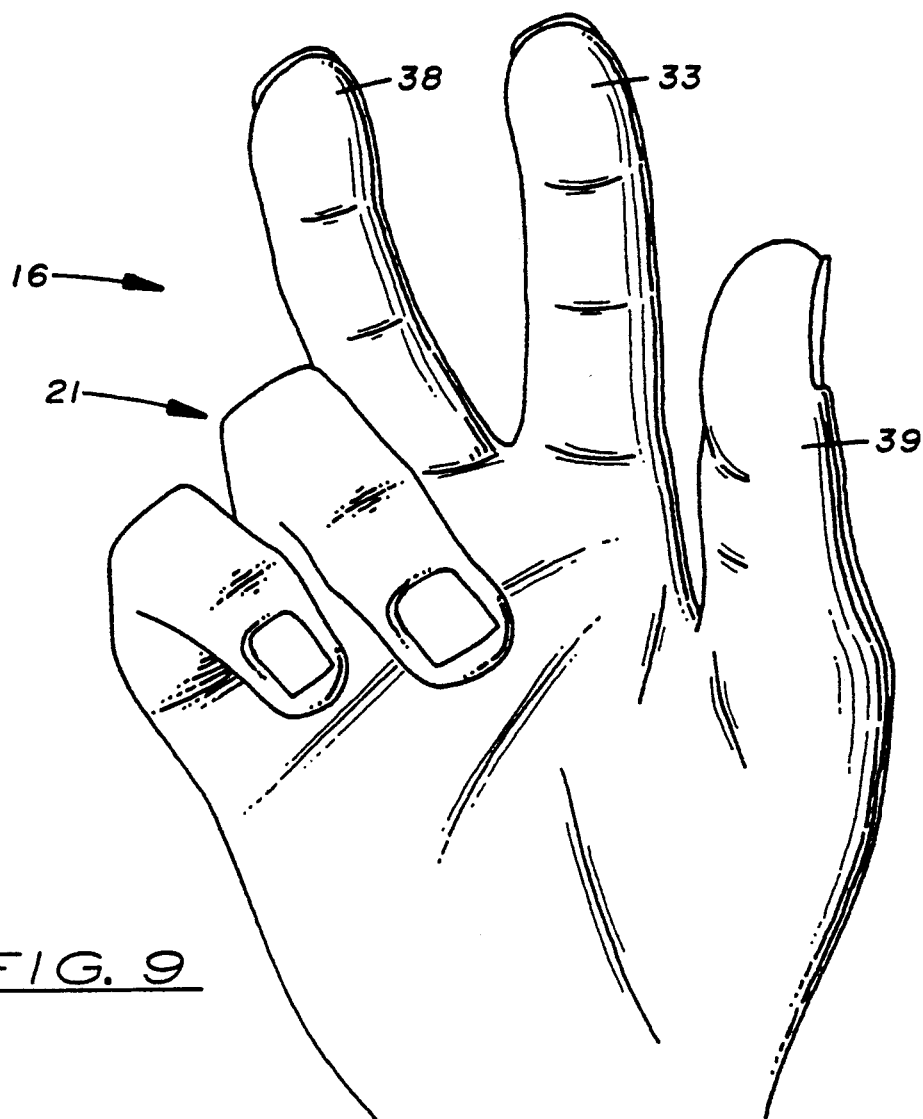
FIG. 9 is an illustration of the gesturing device, in the preferred embodiment, comprising the sender's hand.

As shown in FIG. 9, the sender's hand 21 acts as the gesturing device using three fingers on one hand—the index finger 33, the middle finger 38, and the thumb 39. The index finger 33 serves as a primary indicator while the middle finger 38 and thumb 39 serve as two ancillary indicators. As discussed below, the thumb 39 also may be disposed in a special configuration which enables set of the pointing gestures to be associated with alternative sets of communication codes.

Figure 10:
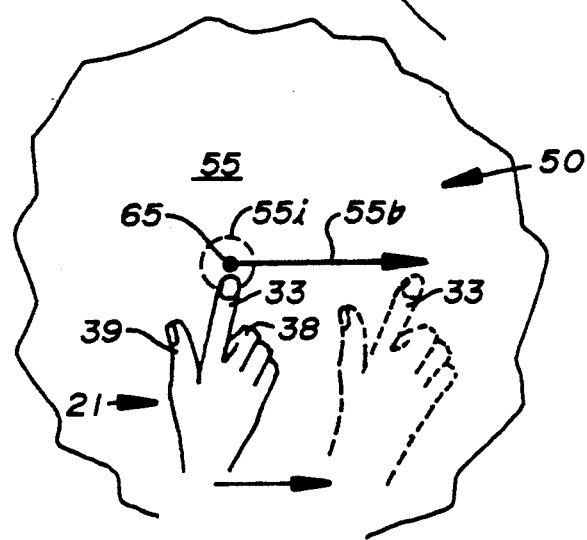
FIG. 10 is an illustration showing the sender using the index finger of one hand acting as the primary indicator, used to delineate a line vector in a sliding motion.

To perform the pointing gesture 22, the sender's hand 21 is first placed in the field 50 as shown in FIG. 1. As discussed above, upon initially entering the field 50, an initial vector pattern 55 shown in FIG. 2 is established by placing the index finger 33 into the field 50 to establish an initial point of origin 65 and to create vector pattern 55. After establishing the point of origin 65, the index finger 33 then selects one of the eight possible line vectors 55(a)-(h) or the point vector 55(i) in the initial vector pattern 55. As shown in FIG. 10, to delineate one of the eight possible line vectors 55(a)-(h), the index finger 33 is moved in a sliding motion along one of the eight line vectors (only vector 55(b) is shown) from the point of origin 65 to its end point. To delineate the point vector 55(i) (not shown), the index finger 33 may remain stationary at the point of origin 65 or may be removed from the field 50 but must re-enter the field at approximately the same location. During communication, the movement or lack of movement of the index finger 33 is detected by the receiver 17 to determine which line vector 55(a)-(h) or point vector 55(i) in the vector pattern 55 is delineated.

Figure 11A:
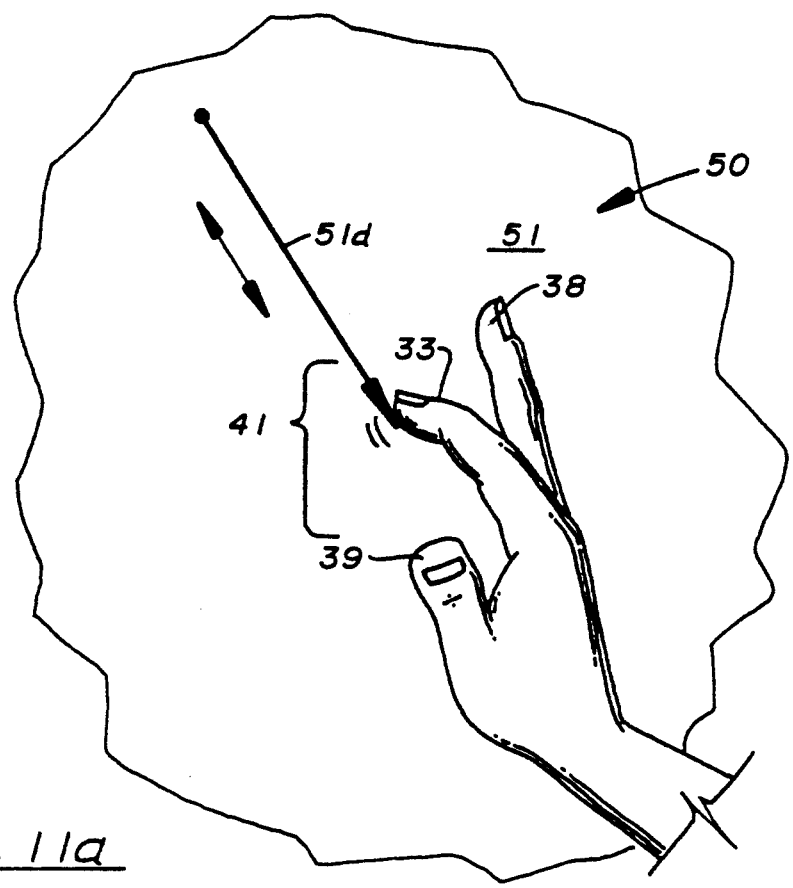
FIGS. 11(a)–(d) are illustrations showing the first, second, third, and fourth configurations used in the preferred embodiment.
Figure 11B:
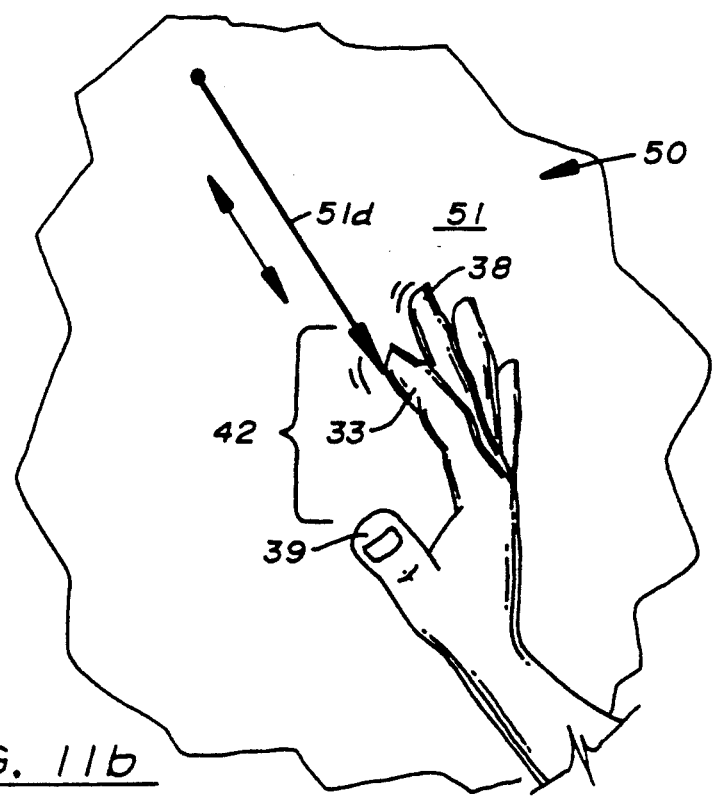
Figure 11C:
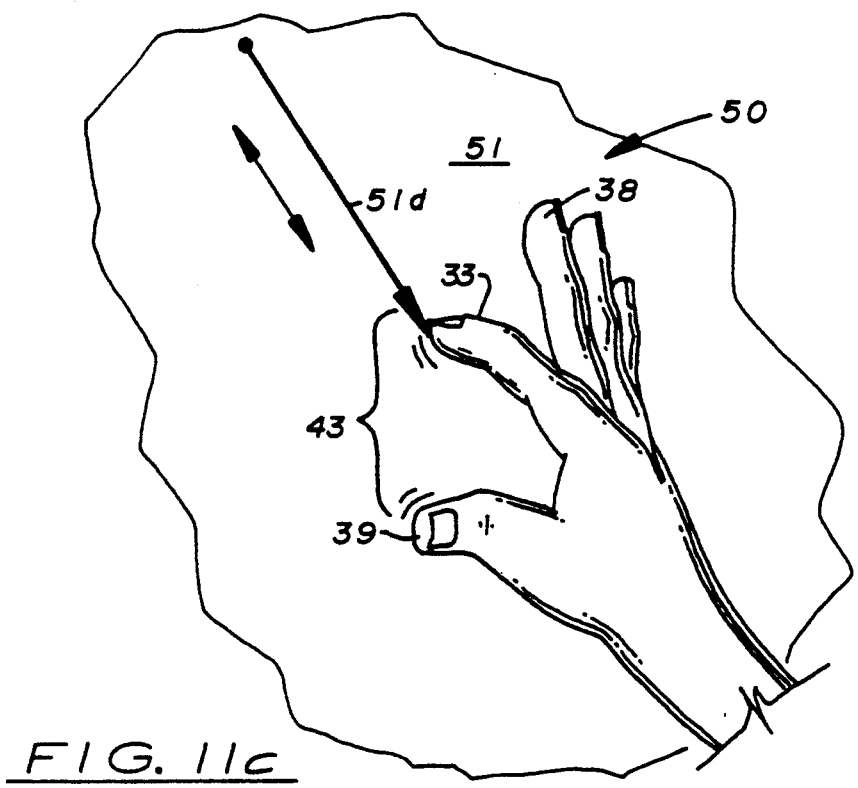
Figure 11D:
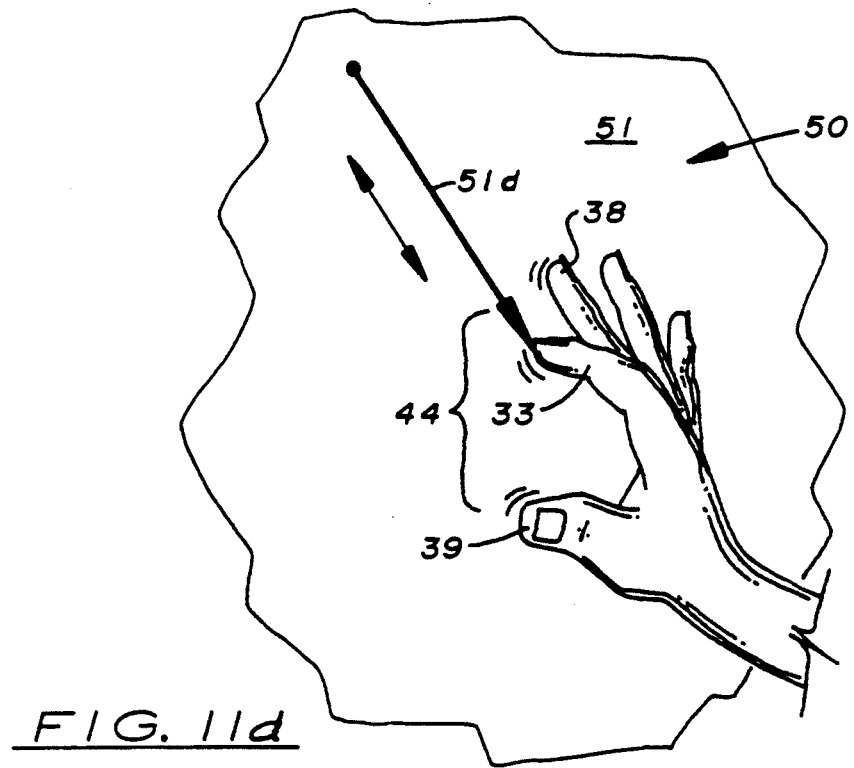

Upon pausing at the end point of the delineated vector, the index finger and the middle finger and thumb, acting as ancillary indicators, are disposed into one of four possible configurations as shown in FIGS. 11(a)-(d). The configurations are formed as the index finger 33 arrives at the end point of the line vector (line vector 51(d) shown) or after pausing briefly at the point vector (not shown). As the configurations are formed, the index finger 33 remains in the field 50 at all times. The first configuration 41, known as the "index only" configuration, shown in FIG. 11(a), is made by pointing only with the index finger 33 at the end point of the vector with the middle finger 38 and thumb 39 lifted off from the field. The second configuration 42, known as the "index-thumb" configuration, shown in FIG. 11(b), is made by positioning both the index finger 33 and the thumb 39 side-by-side in the field 50 with the middle finger 38 lifted out of the field 50. The third configuration 43, known as the "index-middle finger" configuration, shown in FIG. 11(c), is made by positioning the index 33 and middle finger 38 side-by-side in the field 50 with the thumb 39 lifted out of the field 50. The fourth configuration 44, known as the "index-thumb-middle finger" configuration, shown in FIG. 11(d), is made by positioning the index finger 33 and middle finger 38 and thumb 39 side-by-side in the field 40 in a natural position. After a line or point vector has been delineated by the index finger 33, and after one of the four possible configurations have been formed, the sender 15 holds the configuration briefly to complete the pointing gesture.

When the sender becomes fluent, it is anticipated that the four possible configurations 41-44 will be formed by the sender with speed in mind. Therefore, the fingers and thumb will not be fully extended. Instead, the configurations 41-44 will be determined by the proximate touching of one digit to another. The first configuration 41 may be formed, for example, when the digits are not touching. The second configuration 42 may be formed when the index finger and the thumb are touching. The third configuration 43 may be formed when the index and middle finger are touching. The fourth configuration 44 may be formed when the index finger, the thumb, and middle finger are all touching like when holding a thin stylus.

As discussed above, after each pointing gesture is completed, a new vector pattern is automatically established in the field 50. The new vector pattern is created shortly after holding the desired configuration 41-44 by establishing the end point of the previous pointing gesture as the new point of origin in the next vector pattern.

In order to communicate using the above disclosed pointing gesture, the receiver must be able to detect and identify the pointing gesture performed by the sender and then associate the correct communication code thereto. As mentioned above, both the sender and receiver will use the vector pattern mnemonic device 70 shown in FIGS. 7 and 8 to help them. In the preferred embodiment, when a pointing gesture is performed, the receiver uses his eyes as a receiving means to determine visually which vector is delineated by the sender. Throughout the communication, the receiver must be able to determine which pointing gesture is performed. Typically, with individuals the receiver must use his intellect and compare the delineated vector and the configuration with a set of mapping vectors and configurations held or retained in his memory.

Each pointing gesture is then defined by both its vector and the configuration 41-44. Each vector, in turn, has a directional value and a length or distance value. The configuration can be one of four possible configurations 41-44 created by the primary and ancillary indicators. Since in each vector pattern there are nine possible vectors contained therein—one point vector and eight line vectors—and four possible configurations 41-44, a set of thirty-six unique pointing gestures may be performed by the sender in the field.

Figure 12:
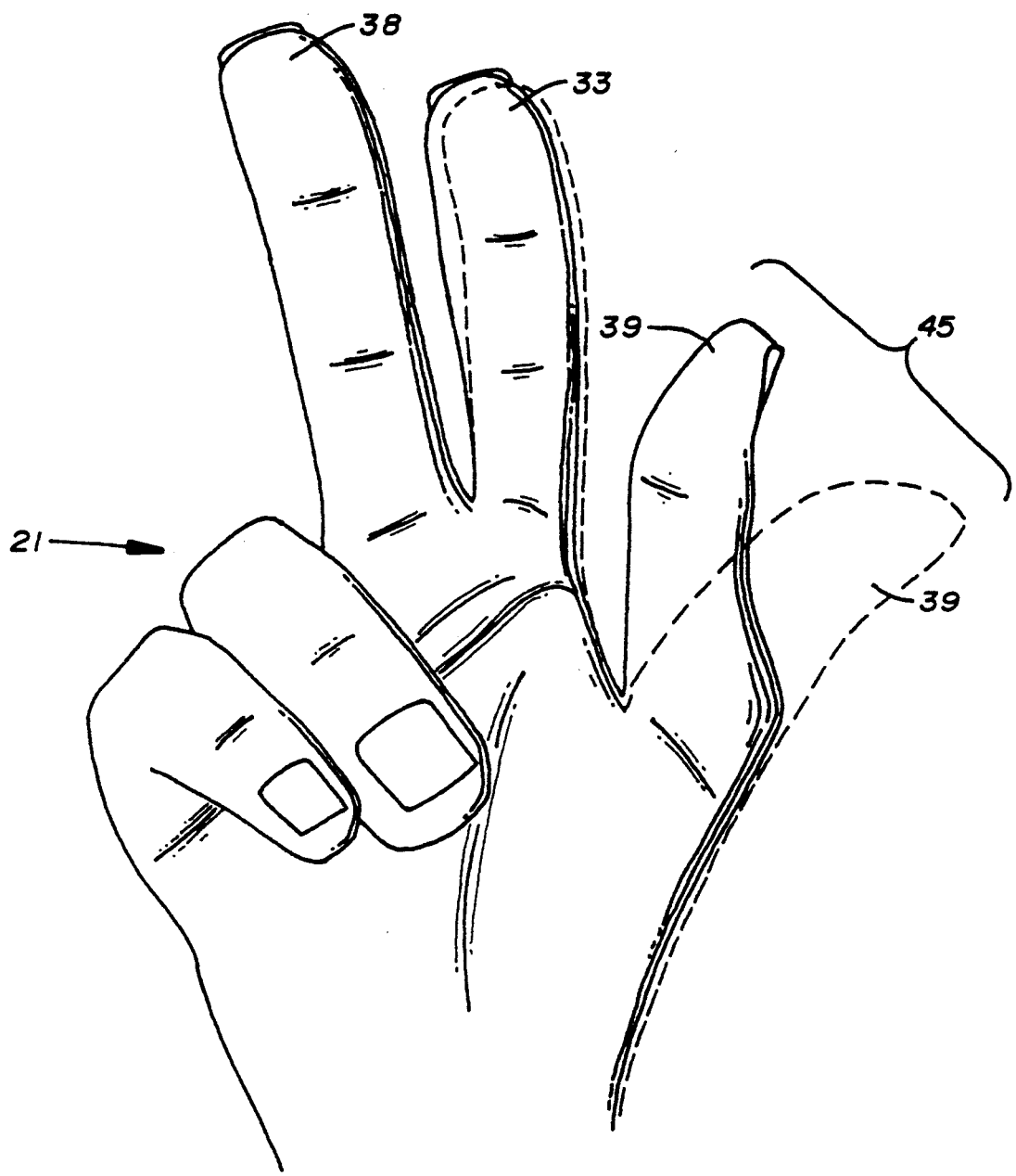
FIG. 12 is an illustration of the special thumb configuration used to select different sets of communication codes.

In addition to forming one of the four possible configurations 41-44, the thumb may also by used to associate or program the pointing gestures with other communication codes. As shown in FIG. 12, the thumb 39 is used to form a "special configuration" 45 by moving the tip of the thumb 39 substantially more than the normal proximate distance from the index finger 33. This "special configuration" 45 may be used to inform the receiver that an alternative set of communication codes, such a set of alpha-numeric codes described later below, are to be associated with the set of pointing gestures.

In order to communicate using the set of thirty-six pointing gestures, each pointing gesture in the set must represent some unique symbol or sound in a language understood by both the sender and the receiver. Each pointing gesture in the set of pointing gestures must be associated with one unique sound or symbol, hereinafter known as a communication code. In the preferred embodiment, English is the selected language with each pointing gesture being associated with one phonetic sound used therein. In another embodiment, the set of pointing gestures is used with a second set of thirty-six alpha-numeric codes comprising one code for each letter of the English alphabet, "A" through "Z", and one number from zero to nine.

Figure 13:
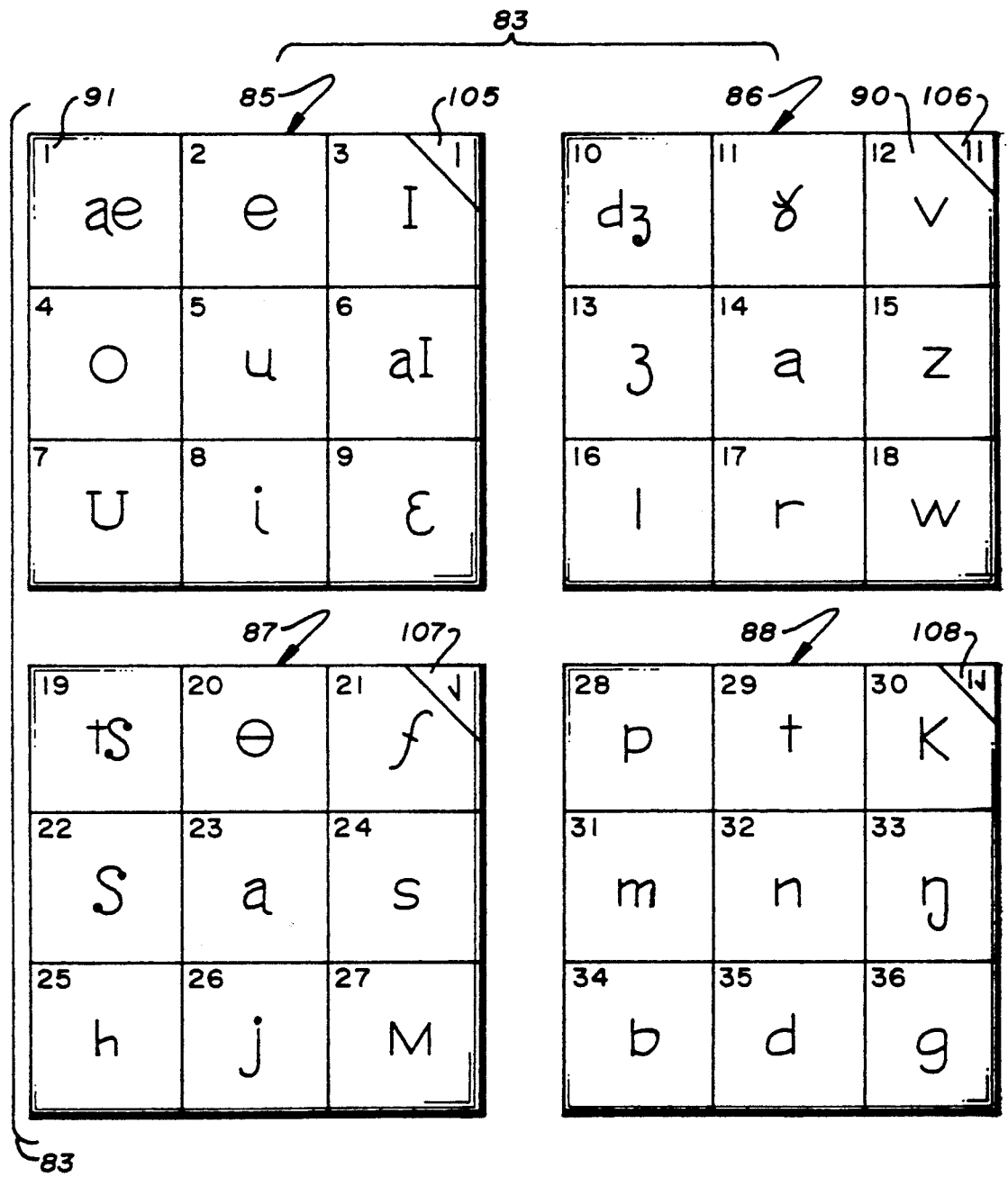
FIG. 13 is a plan view of a phonetic code mnemonic device comprising thirty-six cells distributed among four sheets in a tic-tac-toe manner. Each cell is associated with one phoneme selected from a modified set of IPA phonemes.

In order to better understand how the pointing gestures are associated with the communication codes, mnemonic devices are used. In FIG. 13, a phonetic code mnemonic device, referred to generally as 83, is shown comprising four arrays 85-88, made of paper or other suitable material. Each array 85-88 is flat having nine cells 90 arranged in a tic-tac-toe manner. Each array 85-88 is associated with one of the four possible configurations 41-45. The first array 85, shows the relative position of the communications codes that can be conveyed using the first 41 configuration ("index only"). The second array 86, shows the relative position of the communications codes that can be conveyed using the second configuration 42 ("index-middle finger"). The third array 87, shows the relative position of the communications codes that can be conveyed using the third configuration 43 ("index-thumb"). The fourth array 88, shows the relative position of the communications codes that can be conveyed using the fourth configuration 44 ("index-thumb-middle finger").

With the first set of communication codes, each cell 90 in the phonetic code mnemonic device 83, is assigned to one phonetic sound selected from a set of thirty-six phonetic sounds. In order to assign one phonetic sound to each cell, a modified phonetic alphabet must be established. The most widely accepted phonetic alphabet today, is the International Phonetic Alphabet, abbreviated IPA. In the IPA, every speech sound, or phoneme, can be represented by a particular phonetic symbol which enables it to be used with any spoken language. When every phoneme in a particular language can be represented by one and only one symbol, the language is said to be phonetically ideal. In the present invention, the English language is preferred which contains forty-four different phonemes—nineteen vowels and twenty-five consonants. Since, in the preferred embodiment, only thirty-six pointing gestures are used, eight IPA phonemes must be discarded.

The choice of which phonemes to include and which to discard was founded on the difference between the task of pronouncing a word and the task of identifying a word. It has been discovered that by using a phonetic system whereby the words are identified rather than pronounced, fewer phonemes are required to communicate. Using this phonetic "hinting" system, words do not need to be spelled correctly, but merely spelled phonetically well enough to be distinguishable from all other words. Thus, using this system each pointing gesture represents a unique element or link in the phonetically-based "hinting" alphabet.

The phonetically based "hinting" system by which all non-homophonic words can be identified uses less phonemes than the standard IPA. The unnecessary phonemes are discarded using two special set of rules. First, all phonemes that sound substantially similar are discarded. Second, all phonemes are discarded which may be formed by combining two or more primary phonemes. This second rule requires a decision by the receiver to deduce which phoneme is represented by the pointing gesture.

Table 1 lists modified set of IPA phonemes represented by their respective graphemes used in the IPA.

Using the first criteria, the IPA phoneme "/ɚ/" is discarded in the modified set of IPA phonemes since the phoneme "/r/" is already present. Using the second criteria, the phonemes "/au/" and "/ɔi/" can be discarded from the modified set of IPA phonemes because they can each be represented by a single phoneme, these phonemes are represented by two pointing gestures instead of one. Also the distinction between the two IPA phonemes "/ju/" and "/u/" may be disregarded since both phonemes can be represented in the modified set of IPA phonemes with one phoneme "/u/".

Six more phonemes could be discarded using the second criteria. They include the phonemes that combine phonemes "/c/", "/s/", "/t/", " " and "/z/" with "/h/" and "/ŋ/". However, these six phonemes occur so frequently that they are included in the modified set of IPA phonemes shown in Table 1.

As stated above, FIG. 13 shows the phonetic code mnemonic device 83 which shows how the phonemes used in the modified set of IPA phonemes shown in Table 1 are arranged into a tic-tac-toe manner in arrays 85-88. The phonemes are located in the arrays 85-88 so that the pointing gestures may be performed and understood. At least five considerations of different weight are involved in this optimization. One, the arrangement must facilitate a rapid and rhythmic pointing gesture. Two, the arrangement must be easy to conceptualize. Three, the distribution of the phonemes must be approximately even relative to the frequency of occurrence of phonemes. Four, the sender's expectations and sense of the naturalness of the pointing gesture must correlate in part to the physiological location and structure of phoneme production. And fifth, there are ergonomic considerations such as, the centralized point of origin being the easiest to access, and the hand moving more easily from side-to-side than up and down. The description of the assignment of the modified set of IPA phonemes to specific cells 90 in the phonetic code mnemonic device 83 will proceed in an iterative fashion. Beginning in the upper left hand cell 91 in the first array 85, numbers 102 are placed in the cells 91 to number them consecutively.

It has been discovered that when using the present invention, there is an expectation to point with the index finger alone, ((i.e. with the first configuration 41 ("index only")). Therefore, nine of the necessary eleven vowel phonemes are assigned to cells 90 in the first array 85 which are easiest to access. The two other vowel phonemes are assigned to the central most cells 90 located in the second and third arrays 86 and 87, respectively. This distribution also helps promote a rocking, rhythmic input gesture based on the similarity between the physiology of the three fingers and the arrangement of the vowels and consonants in syllables. The index finger, which indicates vowels, is between the thumb and the middle finger which both indicate consonants. This correlates with typical syllabic construction used in English wherein the vowel is placed between two consonants.

The physiology of the production of vowels, voiced and unvoiced fricatives, liquids, and nasals, correlates with the relative constraints of the placements of the fingers when selecting those phonemes. Of the four possible configurations 41-44, the first configuration 41 ("index only") is the least constrained, the four configuration 44 ("index-thumb-middle finger") is the most constrained, and the second and third configurations 42 and 43, respectively, ("index-middle finger" and "index-thumb", respectively), fall somewhere between. Of the two possible two-finger configurations, the second and third configurations 42 and 43, the third configuration 43 ("index-thumb") is less constrained than the second configuration 42 ("index-middle finger"). Therefore, first configuration 41 ("index only") corresponds with the open mouth vowel production and the fourth configuration 44 ("index-thumb-middle finger") corresponds with the closed mouth of the plosives and nasal, and the second and fourth configurations 42, 44 ("index-middle" and "index-thumb", respectively) correspond with the semi-closed mouth when producing the fricatives and liquids. Thus, the complete provisional assignment is: nine vowels in the first array 85; (first configuration 41) two vowels in the central most cells 90 in the second and third arrays 86 and 87, respectively; the unvoiced and voiced fricatives, liquids in the second and third arrays 86 and 87, respectively, (second configuration 42 and third configuration 43 respectively); and the plosives and nasals in the fourth array 88 (fourth configuration 44).

Next the specific phonemes listed in Table 1 are assigned to specific cells 90 in the phonetic code mnemonic device 83. This further refinement is partly based on complimentary consonant pairs. The physiological production of these phoneme pairs is identical in all respects but one, whether the vocal cords are used or not. Therefore, the complimentary consonant pairs are assigned to complimentary cells 90 located in the different arrays 85-88. Based on this consideration, and choosing the thumb to represent the vocal cords, the voiced fricatives are assigned to the third array 87 (the third configuration 86 or "index-thumb"), and the unvoiced fricatives are assigned to the second array 86 (the second configuration 42 or "index-middle finger").

In the fourth array 88 (fourth configuration 44 or "index-thumb-middle finger"), the complimentary voiced and unvoiced plosives (/b/, /d/, /g/) and (/p/, /t/, /k/) respectively, are arranged using opposing sets of three cells 90 which correspond with the position of the tongue in the mouth during speech. The left most placement corresponds to the phonemes pronounced using the front portion of the mouth, (/p/, /m/, /b/); the central placement corresponds to the phonemes pronounced using the middle portion of the mouth (/t/, /n/, /d/); and right most placement corresponds to the phonemes pronounced using the back portion of the mouth where the plosives and nasals are formed (/k/, /ŋ/, /g/). As shown in FIG. 13, the unvoiced plosives (/p/, /t/, /k/), are assigned to the top horizontal row of cells 90 of the fourth array 88 and the voice plosives (/b/, /d/, /g/), to the cells 90 located on the bottom horizontal row of the fourth array 88. The nasals (/m/, /n/, /ŋ/), are assigned to the middle horizontal row of cells 90 in the fourth array 88. This arrangement represents the complimentary nature of the voiced and unvoiced plosives with the nasals falling between them. The modified set of IPA phonemes uses five voiced fricatives /d /, /ð/,/v/, /z/ and /ʒ/, and five complimentary unvoiced fricatives (/t /, /f/, /θ/, /s/, and /ʃ/ plus unvoiced "h" sound which has no consonant compliment. The fricatives and vowels can all be assigned to specific cells 90 of phonetic code mnemonic device 83, as a function of the physiology of production of speech, but the resulting pattern does not map to the arrays as neatly as does the pattern of plosives and nasals. For this reason, the remaining assignments are based on mnemonic, ergonomic, and frequency considerations more than on purely physiological considerations.

The vowels are assigned to specific cells 90 of first array 85 primarily for mnemonic reasons and secondarily as a function of the frequency of occurrence of combinations of phonemes. The long vowels /e/, /i/, /ai/, /o/, and /u/ are usually the first vowels that an individual learns. It has proven easy to learn the locations of the "long vowels" by making a large "plus" (+) sign with "/e/" indicated at the top and "/i/" at the bottom of the vertical member; "/ai/" indicated on the right side and "/o/" indicated on the left side of the horizontal member, and "/u/" located at the center. The short vowel sounds are analogously arranged by rotating the "plus" sign mentioned above slightly to the left thereby making an "x" sign. Using the "x" sign, the "/æ/" sound is indicated at the top left, "/ε/" sound is indicated at the bottom right, the "/I/" sound is indicated at the top right, the "/U/" sound is indicated at the bottom left. The remaining vowels "/a/" and "/ə/" are assigned to the centers of second and third arrays 86 and 87, respectively.

The remaining assignments of unvoiced and voiced fricatives and liquids are based primarily on the frequency of occurrence of combinations of phonemes, while keeping the complimentary consonants in identical vectors.

It should be appreciated that although in the preferred embodiment for reasons of speed and accuracy, only thirty-six unique pointing gestures are used. The number of possible pointing gestures capable of being performed in the field is, however, unlimited. This feature makes the invention disclosed herein adaptable for use with any language or codeable means known to the inventor. It should also be apparent with the preferred embodiment, that because each pointing gesture is associated with one phonetic sound, and because each pointing gesture can be performed quickly, the method of communication using pointing gestures described herein may be used at or near normal conversational speed. Graphic symbols, 105–108 representing each configuration 41–44, respectively are printed in the upper right-hand corner of each corresponding array 85–88, respectively to aid the user.

Figure 14:
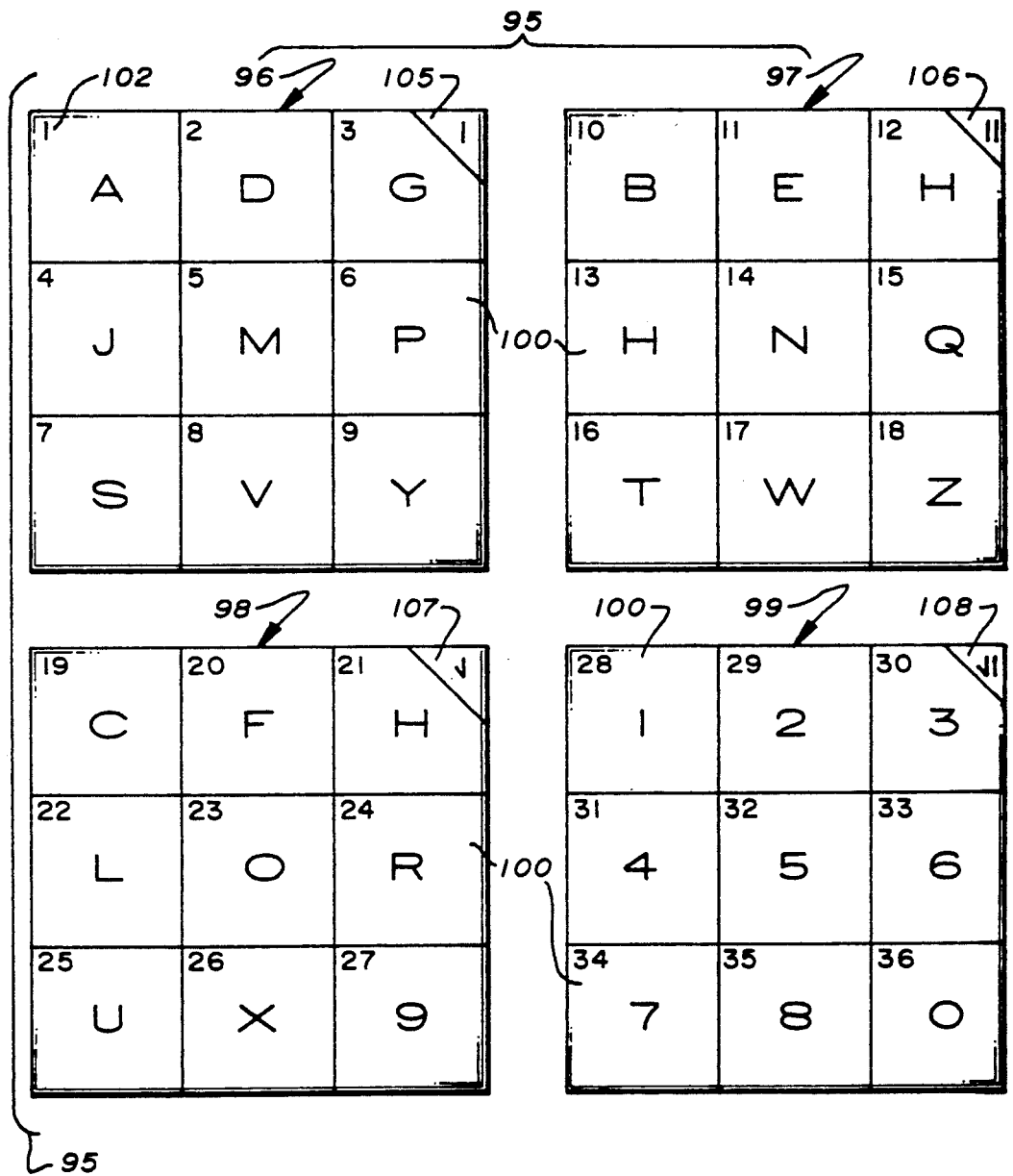
FIG. 14 is a plan view of an illustration of an alpha-numeric code mnemonic device comprising thirty-six cells distributed among four arrays in a tic-tac-toe manner. Each cell is associated with one code from the set of codes comprising each letter of the English alphabet and numbers 0 to 9.

FIG. 14 shows an alpha-numeric code mnemonic device 95 comprising four arrays 96–99, each comprised of nine cells 100 arranged in a tic-tac-toe manner. Each array 96–99 is associated with one of the four possible configurations 41–44 shown in FIGS. 11(a)–(d), respectively. Beginning with the upper left hand cell 100 in the first array 96, all the letters in the English alphabet are arranged as shown in FIG. 14. The numbers "0"–"9" are arranged beginning with the last cell 100 in the third array 98 and continue to the top left cell 100 in the fourth array 99. Beginning in the upper left hand cell 100 in the first array 91, numbers 102 are placed in the cells 100 to number them consecutively. Graphic symbols, 105–108 representing each configuration 41–44 are placed in the upper right-hand corner of each corresponding array 96–99, respectively, to aid the user.

In order to better understand how the above disclosed pointing gestures are used to communicate between a sender and a receiver, the follow examples are provided.

EXAMPLE 1

The following example will show how to convey the sentence, "MY NAME IS JOE, SPELLED J-O-E.", using the set of thirty-six pointing gestures with each pointing gesture associated with one code. As further explained, each code is one phoneme used in the modified set of IPA phonemes shown in Table 1 and shown in FIG. 13 on the phonetic code mnemonic device 83. In order to spell, each pointing gesture is associated with a letter or number used in the alpha-numeric code mnemonic device 95 shown in FIG. 14. Before explaining the method, it is to be understood that both the sender and receiver are sufficiently knowledgeable and fluent in performing and understanding the pointing gestures, and can associate each pointing gesture with the correct communication code shown in both the phonetic code mnemonic device 83 and alpha-numeric code mnemonic device 95 shown in FIGS. 13 and 14, respectively.

The sender and receiver first position themselves so that the field may be viewed, by the receiver. Communication begins when the sender chooses one hand and initially places the index finger into the field. This activates the field and establishes vector pattern 55 as shown in FIGS. 2 or 3(e).

To convey the first phoneme "/m/" of the word "MY", the sender moves his index finger horizontally to the left in a sliding motion from the point of origin 65 along line vector 55(f) and then pauses, which delineates vector 55(f). Since there are no "longer-than-short" vectors in vector pattern 55, the delineation of vector 55(f) establishes the length of the "short" vector. By definition then, anything longer that the short vector is a "longer-than-short" vector. Before pausing, the index finger along with the middle finger and thumb, acting as ancillary indicators, are disposed into the fourth configuration 44 ("index-thumb-middle finger"), as shown in FIG. 9(d) to convey the phoneme "/m/" to the receiver. The end point of vector 55(f) now serves as the new point of origin 64 for the vector pattern 54. The sender now moves his index finger horizontally in a sliding motion to the right, across the field a "longer-than-short" distance to delineate the vector 54(e). Before pausing, the index finger, middle finger, and thumb are disposed in the first configuration 41 (index only) as shown in FIG. 1(a) to the convey the phoneme "/aI/" to the receiver. The end point of vector 54(e) now serves as the new point of origin 66 and the vector pattern 56 is automatically established.

To signal the end of the first word "MY" the sender removes the hand from the field by pulling it back towards his chest. It is understood by the sender and the receiver that even though the hand has been removed from the field, the field remains activated in its existing vector pattern, (i.e. vector pattern 56).

Next, the sender places his index finger back into the field horizontally a short distance to the left of the point of origin 66 to delineate vector 56(d). Before pausing, the index finger, middle finger, and thumb are disposed into the fourth configuration 44 ("index-thumb-middle finger") to convey the phoneme "/n/" to the receiver. After pausing, a new point of origin 65 is established and the vectors in the field then relocate to create vector pattern 55. The sender then moves his index finger upward vertically in a sliding motion to delineate vector 55(h). Before pausing, the index finger, middle finger, and thumb are disposed into the first configuration 41 (index only) to convey the phoneme "/a/" to the receiver. Upon pausing, new point of origin 62 is established and the vector relocate to create vector pattern 52. The sender then moves his index finger downward in a sliding motion diagonally to the left to delineate the vector 52(g). Before pausing, the index finger, middle finger, and thumb are disposed into the fourth configuration 44 ("index-thumb-middle finger") to convey the phoneme "/m/" to the receiver Upon pausing, the new point of origin 64 is established and the vectors relocate to create vector pattern 54. The sender then removes his hand from the field, as stated above, to signify the end of the word "NAME". The sender then re-enters the field by placing his index finger diagonally above and to the right of point of origin 64 anywhere along vector 54(c). Before pausing, the sender disposes the index finger, middle finger, and thumb into the first configuration 41 ("index only") to convey the phoneme "/I/" to the receiver. Upon pausing, the new point of origin 63 is established and the vectors in the field relocate to create vector pattern 53. The sender then moves the index finger downward vertically in a sliding motion a "short" distance to delineate the vector 53(a). Before pausing, the index finger, middle finger, and thumb are disposed into the third configuration 43 ("index-thumb") shown in FIG. 11(c) to convey the phoneme "/s/" to the receiver. Upon pausing, the new point of origin 66 is established and the vectors in the field relocate to create vector pattern 56. The sender then removes his hand from the field to signify the end of the word "IS".

The sender then re-enters the field upward, and diagonally to the left of point of origin 66 by placing the index finger somewhere along vector 56(f). Before pausing, the index finger, middle finger, and thumb are disposed into the third configuration 43 ("index-thumb") to convey the phoneme "/dʒ/" to the receiver. Upon pausing, the new point of origin 61 is established and the vectors in the field are relocated to create vector pattern 51. The sender then moves the index finger downward diagonally in a sliding motion a "short" distance along vector 51(g). Before pausing, the index finger, middle finger, and thumb are disposed into the first configuration 41 ("index only") to convey the phoneme "/o/" to the receiver. Upon pausing, the new point of origin 64 is established and the vectors in the field relocated to create vector pattern 54. The sender then removes his hand from the field to signify the end of the word "JOE".

Next, to convey the word "SPELLED", the sender re-enters the field horizontally a "longer-than-short distance" to the right of the point of origin 64 by placing the index finger along vector 54(e). Before pausing, the index finger, middle finger, and thumb are disposed into the fourth configuration 44 ("index-thumb-middle finger") to convey the phoneme "/s/" to the receiver. Upon pausing, the new point of origin 66 is established and the vectors in the field relocated to create vector pattern 56. Before pausing, the sender then moves the index finger upward diagonally in a sliding motion along vector 56(f). Before pausing, the index finger, middle finger, and thumb are disposed into the "index thumb-middle finger" configuration to convey the phoneme "/p/" to the receiver. Upon pausing, the new point of origin 61 is established and the vectors in the field relocated to create vector pattern 51. The sender then moves the index finger in a sliding motion "longer-than-short" distance along vector 51(e). Before pausing, the index finger, middle finger, and thumb are disposed into the first configuration 41 ("index-only") to convey the phoneme "/ɛ/" to the receiver. Upon pausing, the new point of origin 69 is established and the vectors in the field relocated to create vector pattern 59. The sender then moves the index finger to the left horizontally in a sliding motion a "longer-than-short" distance along vector 59(b). Before pausing, the index finger, middle finger, and thumb are disposed into the third configuration 43 ("index-thumb") to convey the phoneme "/l/" to the receiver. Upon pausing, the new point of origin 67 is established and the vectors in the field relocated to create vector pattern 57. The sender then moves the index finger to the right horizontally in a sliding motion a "short" distance along vector 57(g). Before pausing, the index finger, middle finger, and thumb are disposed into the third configuration 43 ("index-thumb") to convey the phoneme "/d/" to the receiver. Upon pausing, the new point of origin 68 is established and the vectors in the field relocated to create vector pattern 58.

In order to spell the word "JOE", the alpha-numeric set of codes, shown in FIG. 14, must be associated with the set of thirty-six pointing gestures. This association is accomplished by holding the index finger in the same relative position in the field and sliding the thumb into the special configuration 45 shown in FIG. 12. This informs the receiver that the pointing gestures are to be associated with the alpha-numeric set of codes.

The sender then moves his index finger in a sliding motion diagonally to the left, above point of origin 58(i) along vector 58(b). Before pausing, the index finger, thumb, and middle finger are disposed into the first configuration 41 ("index only") to convey the letter "J" to the receiver. Upon pausing, the new point of origin 64 is established and the vectors relocate to create vector pattern 54. The sender then moves his index finger horizontally to the right in a sliding motion a "short" distance along vector 54(d). Before pausing, the index finger, thumb, and middle finger are disposed into the third configuration 43 ("index-thumb") to convey the letter "0" to the receiver. Upon pausing, the new point of origin 65 is established and the vectors relocate to create vector pattern 55. The sender then moves his index finger vertically upward in a sliding motion along vector 55(h). Before pausing, the index finger, thumb, and middle finger are disposed into the second configuration 42 ("index-middle") to convey the letter "E" to the receiver. Upon pausing, the new point of origin 62 is established and the vectors relocate to create vector pattern 52.

To terminate the communication, the sender either pauses 2 to 5 seconds, removes his hand from the field and waves it back and forth laterally from side to side, or signal the end by any other pre-agreed manner.

In compliance with the statute, the invention has been described in language more or less specific as to steps required to practice the method. It is understood, however, that the invention is not limited to the specific steps described herein, since they describe the preferred manner of putting the invention into practice. The invention is therefore claimed in any of its forms or modifications with the legitimate and valid scope of the appended claims properly interpreted in accordance with the doctrine of equivalents.

INDUSTRIAL APPLICABILITY

The invention disclosed herein, will have wide application in various fields where voice or written communication between individuals is not possible or desirable. In addition, the invention disclosed herein, will have wide application and use in communications between individuals and computers having receiving means capable of detecting and identifying pointing gestures. For example, the invention will have wide application in the handicapped fields where sign languages are useful or for the voice impaired. The invention will also have wide application in the computer field wherein the set of pointing gestures may be performed on touch pads devices enabling one to communicate phonetically with a computer at conversational speed.

TABLE 1
MODIFIED SET OF IPA PHONEMES

A. Consonants:

1. /b/ as in baby.
2. /d/ as in did, ladder.
3. /f/ as in fluff, rough, physics.
4. /g/ as in go, egg, beg.
5. /h/ as in help, ahead, who.
6. /k/ as in keep, take, cool, ache, back.
7. /l/ as in leap, pool, call, allow.
8. /m/ as in me, came, summer.
9. /n/ as in no, can, winner.
10. /p/ as in pay, cup, supper.
11. /r/ as in run, car, drink, grow, arrow.
12. /s/ as in sit, city, bus, miss, passing.
13. /t/ as in take, hit, letter, missed.
14. /v/ as in vine, wave, ever.
15. /w/ as in we, wind, one, quit.
16. /z/ as in zero, does, his, easy.
17. /j/ as in you, yellow, onion, canyon.
18. /ŋ/ as in sing, long, coming, ink, bank.
19. /ʃ/ as in she, cash, tissue, option.
20. /ʒ/ as in vision, azure, rouge.
21. /tʃ/ as in chew, each, church, catch.
22. /dʒ/ as in jump, joke, George, edge, page.
23. /ʍ/ as in what, when, somewhere.
24. /θ/ as in think, bath, ether.
25. /ð/ as in these, bathe, either.

B. Vowels:

26. /i/ as in machine, be, seem, meat, believe, receive.
27. /I/ as in sit, pick, bicycle, near, women.
28. /e/ as in cake, name, paid, say, break.
29. /ɛ/ as in bet, red, breakfast.
30. /æ/ as in sat, glad, happy, and as most Americans pronounce half, pass, can't, and path.
31. /a/ as father, car, heart, and as most Americans pronounce not, lock, doll, hop. This also

TABLE 1-continued
MODIFIED SET OF IPA PHONEMES includes the IPA phonemes: /a/, as many Easterners pronounce half, pass, can't, path; //, as some Easterners pronounce not, lock, doll, hop (with lips slightly rounded); and //, as in warm, fall, law, dawn.

32. /o/ as in go, home, omit, coat, hoe.
33. /U/ as in foot, book, pull, push, woman.
34. /u/ as in do, move, food, boot, tune, due, new.
35. /ə/ as in cut, up, us, come, mother, above, sofa. Many Easterners and Southerners who "drop the /r/" also in after, winter, permit, dollar.
36. /aI/ as in ice, fly, tie, side, I.

I claim:

1. A method of communication in a language by sender and a receiver, comprising:
   a. selecting a set of pointing gestures by said sender and said receiver, said set of pointing gestures including a plurality of unique pointing gestures, each said pointing gesture including one primary indicator capable of selecting one vector pattern in a field having a plurality of said vector patterns and capable of delineating one vector within said selected vector pattern, said vector capable of being detected by said receiver, and a plurality of ancillary indicators, each said ancillary indicator capable of being disposed together with said primary indicator into one of a plurality of configurations, each said configuration capable of being detected by said receiver;
   b. associating one communication code used in said language with each said pointing gesture from said set of pointing gestures by said sender;
   c. performing a plurality of said pointing gestures by said sender to communicate a message to said receiver, each said pointing gesture being performed by delineating one said vector in said field with said primary indicator and then disposing said ancillary indicators together with said primary indicator into one said configuration;
   d. identifying by said receiver said pointing gestures performed by said sender, and;
   e. associating by said receiver each said pointing gesture identified with said associated communication codes so that said message is communicated from said sender to said receiver.

2. A method of communication, as recited in claim 1, wherein said gesturing device is the sender's hand and said primary indicator is the index finger and the ancillary indicators are the thumb and middle finger of said hand.

3. A method of communication, as recited in claim 2, wherein said primary indication and said ancillary indicators may be disposed into four configurations comprising a first "index only" configuration, a second "index-middle" configuration, a third "index-thumb" configuration, and a fourth "index-thumb-middle" finger configuration.

4. A method of communication, as recited in claim 3, wherein there are thirty-six said communication codes taken from a modified set of IPA phonemes including the following: /b/, /d/, /f/, /g/, /h/, /k/, /l/, /m/, /n/, /p/, /r/, /s/, /t/, /v/, /w/, /z/, /j/, /ŋ/, /ʃ/, /ʒ/, /tʃ/, /dʒ/, /ʍ/, /θ/, /ð/, /i/, /I/, /e/, /ɛ/, /æ/, /a/, /o/, /U/, /u/, /ə/, and /aI/.

5. A method of communication, as recited in claim 4, further comprising disposing said thumb to form a special configuration to signify the association of an alternative set of communication codes with each said pointing gesture.

6. A method of communication, as recited in claim 5, wherein said alternative set of communication codes comprise the set of alpha-numeric codes including all the letters in the English alphabet and the integers 0 to 9.

7. A method of performing a pointing gesture by a sender to a receiver using the index and middle fingers and thumb of one hand, comprising:
   a. placing said hand in a field between said sender and said receiver, said field being capable of having a plurality of vector patterns established therein by placing said index finger into said field at different locations, each said vector pattern established in said field having a plurality of vectors;
   b. establishing one said vector pattern in said field by placing said index finger in said field;
   c. delineating one said vector in said vector pattern by moving said index finger in said field, said vector being detectable by said receiver;
   d. disposing said index finger, said middle finger, and said thumb into one of a plurality of configurations, said delineated vector and said configuration together creating one unique pointing gesture, and;
   e. holding said index and said middle fingers and said thumb in said configuration for a sufficient period so that said pointing gesture can be detected by said receiver.

8. A method of performing a pointing gesture, as recited in claim 7, wherein said field contains nine vector patterns.

9. A method of performing a pointing gesture, as recited in claim 8, wherein each said vector pattern comprises nine vectors.

10. A method of performing a pointing gesture, as recited in claim 7, wherein four said configurations may be created including a first configuration, a second configuration, a third configuration and a fourth configuration.

11. A method of performing a pointing gesture, as recited in claim 10, wherein said first configuration comprises said index finger placed into said field with said middle finger and said thumb being removed from said field.

12. A method of performing a pointing gesture, as recited in claim 10, wherein said second configuration comprises said index finger and said middle finger placed into said field and said thumb being removed from said field.

13. A method of performing a pointing gesture, as recited in claim 10, wherein said third configuration comprises said index finger and said thumb placed into said field and said middle finger being removed from said field.

14. A method of performing a pointing gesture, as recited in claim 10, wherein said fourth configuration comprises said index finger, said thumb, and said middle finger are placed into said field.

15. A vector pattern mnemonic device for learning the vector patterns in a field for use in communicating with pointing gestures, comprising: a substantially flat sheet having one viewable surface, four corners, one central point, and two horizontal and two vertical edges, said sheet being made of lightweight material having substantially the same dimensions of the shape created when said vector patterns are overlapped, said sheet having nine points of origin located at said four corners, at said central point, and at the mid-points of each said horizontal and said vertical edges, each said points of origin being interconnected by a straight line representing all of the possible vectors in said vector patterns, said viewable surface having two vertical lines and two horizontal lines printed thereon which cross to form nine cells arranged in a tic-tac-toe manner on said viewable surface.

16. An alpha-numeric code mnemonic device used with a set of pointing gestures used to communicate, comprising:
   a. four arrays, each array having nine cells arranged in a tic-tac-toe manner on one surface thereby forming thirty-six cells total, each array being associated with one of four possible configurations used to perform said pointing gestures, and;
   b. a set of alpha-numeric codes, each said code being associated with one said cell, each said code being taken from a set of alpha-numeric codes, said set of alpha-numeric codes including all of the letters in the English alphabet and the integers 0 to 9.

17. A phonetic code mnemonic device used with a set of pointing gestures used to communicate, comprising:
   a. four arrays, each array having nine cells arranged in a tic-tac-toe manner on one surface thereby forming thirty-six cells total, each array being associated with one of four configurations used to perform said pointing gestures, and;
   b. thirty-six phonemes, one said phoneme being associated with one said cell, each said phoneme being taken from a modified set of IPA phonemes including the following: /b/, /d/, /f/, /g/, /h/, /k/, /l/, /m/, /n/, /p/, /r/, /s/, /t/, /v/, /w/, /z/, /j/, /ŋ/, /ʃ/, /ʒ/, /tʃ/, /dʒ/, /ʍ/, /θ/, /ð/, /i/, /ɪ/, /e/, /ɛ/, / /, /a/, /o/, /U/, /u/, /æ/, and /aI/.

* * * * *